(No Model.)
F. KINGSTON.
Slip-Link for Coupling-Chains.
No. 227,793. Patented May 18, 1880.
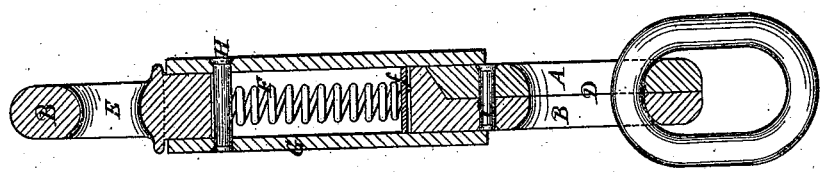
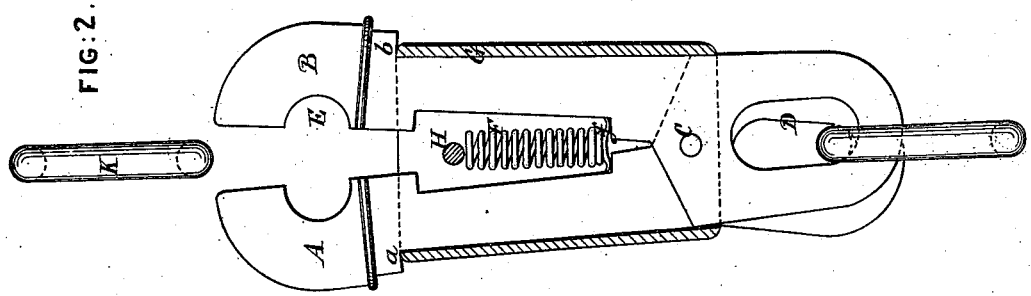
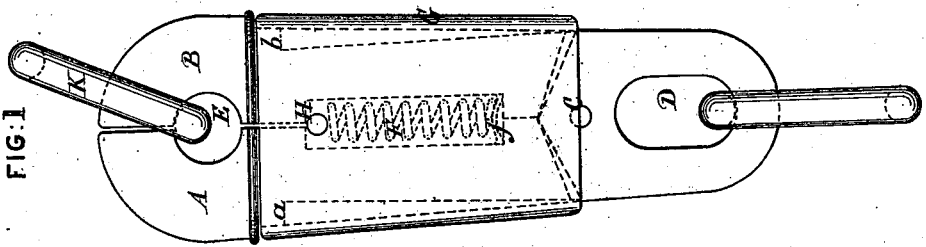
WITNESSES:
Jas. E. Hutchinson.
J. A. Rutherford
INVENTOR-
Frank Kingston,
by James L. Norris,
Att'y.

United States Patent Office.

FRANK KINGSTON, OF GREENWICH, ENGLAND.

SLIP-LINK FOR COUPLING-CHAINS.

SPECIFICATION forming part of Letters Patent No. 227,793, dated May 18, 1880.

Application filed April 6, 1880. (No model.) Patented in England August 12, 1878.

*To all whom it may concern:*

Be it known that I, FRANK KINGSTON, of Greenwich, in the county of Kent, England, have invented a new and useful Improved Slip-Link for Coupling-Chains, Ropes, Harness, Tension-Rods, and the like, for which I have obtained a patent in Great Britain, No. 3,186, bearing date August 12, 1878, and of which the following is a specification.

My invention relates to a construction of slip-link or means of coupling one part of a chain, rope, harness-trace, or tension-rod to another in such manner that the parts can be readily and rapidly connected or disconnected. For this purpose I construct the link in two parts, joined together at the one end, with an eye half in each part at the other end for the reception of a link or loop. Between the two hinged parts is a space containing a spring, and outside the two parts is a sliding sheath, a pin of which bears on the spring. This sheath is made taper to fit on the exterior of the two parts of the link, which are also tapered. The spring forces the sheath forward over shoulders, so as to press the two parts of the link together, and so close the eye which receives the link or loop; but on pulling back the sheath the two parts of the link are opened away from each other sufficiently far to let the link or loop be drawn out of the divided eye or to be inserted into it. To facilitate its insertion the split of the eye may be made trumpet-mouthed.

In employing the link above described for harness it may be attached to or combined with a traction-spring of any known construction for easing the strain at starting the vehicle.

In the drawings, Figure 1 represents a front view of a link according to my invention, closed to form the connection from one part of a chain to another. Fig. 2 represents a vertical section of the link opened for the purpose of disconnecting the two parts of the chain, and Fig. 3 represents a vertical transverse section.

The link consists of two limbs, A and B, jointed together at C like the limbs of a pair of pinchers, their lower ends forming a closed eye at D, and their upper ends forming, when closed, another eye at E.

Between the two limbs A and B is placed a helical spring, F, the lower end of which bears upon a bent blade-spring, $f$, that butts against the interior of the limbs A and B.

A sliding sheath, G, incloses the middle portions of the limbs, and a pin, H, which passes through the two sides of the sheaths, bears upon the upper end of the spring F.

The limbs A and B are formed with projecting shoulders at $a$ and $b$, respectively. When the upper lip of the sheath G incloses these shoulders, as shown in Fig. 1, the upper eye, E, is kept closed, so as to retain the link K within it; but when the sheath G is drawn downward to the position shown in Fig. 2, so that its upper lip escapes the shoulders $a$ and $b$, the springs F and $f$ are compressed, and the latter forces the links A and B apart, opening the eye E, so that the link K can be withdrawn.

When it is desired to close the eye E the upper ends of A and B are pressed together by hand, and the springs F and $f$ thereupon push the sheath G upward, causing its upper lip to pass over the shoulders $a$ and $b$, so as to keep the eye E closed until the sheath be again withdrawn.

Having thus described the nature of my invention and the best means I know of putting it in practice, I claim—

1. A slip-link consisting of two limbs pivoted together and embraced by a sliding sheath constantly acted upon by a spring, which causes said sheath to draw the two limbs together, substantially as described.

2. In a slip-link, the two jointed limbs A B, forming an eye at E, and having shoulders $a$ and $b$, operating in combination with the sliding sheath G, spring F, and pin H, substantially as and for the purposes herein set forth.

In testimony whereof I have hereunto set my hand and seal, in the presence of two subscribing witnesses, this 20th day of March, A. D. 1880.

FRANK KINGSTON. [L. S.]

Witnesses:
 CHAS. BERKLEY HARRIS,
 JOHN DEAN,
 *Both of 17 Gracechurch Street, London.*